(12) United States Patent
Powell et al.

(10) Patent No.: US 11,303,838 B2
(45) Date of Patent: Apr. 12, 2022

(54) USING PIXEL READOUT REORDERING TO REDUCE PATTERN NOISE IN IMAGE SENSOR

(71) Applicant: SHENZHEN GOODIX TECHNOLOGY CO., LTD., Shenzhen (CN)

(72) Inventors: Matthew Powell, Austin, TX (US); Mohamed Elsayed, Austin, TX (US)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 135 days.

(21) Appl. No.: 16/869,290

(22) Filed: May 7, 2020

(65) Prior Publication Data

US 2021/0352236 A1 Nov. 11, 2021

(51) Int. Cl.
*H04N 5/369* (2011.01)
*H04N 5/378* (2011.01)
*H04N 5/374* (2011.01)

(52) U.S. Cl.
CPC ............. *H04N 5/378* (2013.01); *H04N 5/374* (2013.01)

(58) Field of Classification Search
None
See application file for complete search history.

(56) References Cited

U.S. PATENT DOCUMENTS

| | | |
|---|---|---|
| 9,191,582 B1 | 11/2015 | Wright et al. |
| 2002/0080163 A1* | 6/2002 | Morey ............... H04N 7/17318 715/727 |
| 2009/0237542 A1 | 9/2009 | Lehr et al. |
| 2015/0237284 A1 | 8/2015 | Petilli et al. |
| 2017/0214869 A1* | 7/2017 | Ladd .................. H04N 5/37455 |
| 2019/0342513 A1* | 11/2019 | Doege ................... H04N 5/378 |
| 2020/0068156 A1 | 2/2020 | Ma et al. |

* cited by examiner

*Primary Examiner* — Mark T Monk
(74) *Attorney, Agent, or Firm* — Kilpatrick Townsend & Stockton LLP

(57) ABSTRACT

An image sensor includes a pixel array having a plurality of pixels arranged in rows and columns, a plurality of pixel readout lines coupled to respective pixels, a multiplexing circuit coupled to the pixel readout lines, a plurality of analog-to-digital converters coupled to the multiplexing circuit, and a controller configured to provide pixel readout signals of pixels arranged in a same column to the analog-to-digital converters through the multiplexing circuit for concurrent signal conversion.

20 Claims, 8 Drawing Sheets

USING PIXEL READOUT REORDERING TO REDUCE PATTERN NOISE IN IMAGE SENSOR

TECHNICAL FIELD

The present invention relates to a complementary metal oxide semiconductor (CMOS) image sensor and a method of operating the same. More particularly, the present invention relates to a CMOS image sensor and a method of operating the same with readout reordering.

BACKGROUND

A modern CMOS image sensor (CIS) with large pixel count (for example, a 48-megapixel array) will typically readout an entire row of pixels at one time with a large number of ADCs operating simultaneously. As the entire pixel array is read out, each ADC operates on each pixel in a column in turn. Various non-idealities in the pixel and read out structure can impact image quality. For example, noise in the read out process can negatively impact the signal-to-noise ratio (SNR), which is especially meaningful in low light images. Gain variation between pixels results in an image with varying intensity on what should be uniform regions. This appears as a spatial noise and primarily impacts bright portions of the image. Various techniques are employed to deal with both types of impairments and minimize them as much as possible.

FIG. 1 is a block diagram illustrating an image sensor 100 that performs a known pixel readout scheme. Referring to FIG. 1, image sensor 100 includes a pixel array having eight rows (row 1 to row 8) by 4 columns (col 1 to col 4) of pixel sensors (alternatively referred to pixels) (p11 to p84), each of the pixels in the same column is provided to a respective analog-to-digital converter (ADC) for digital signal conversion under control of a row control circuit and a column control circuit. The row control circuit starts the readout process by selecting a row, e.g., row 1, and the column control circuit provides pixel signals of the pixels in the selected row to the respective ADCs for signal conversion. The readout process will continue successively from to the next row and so forth until pixels in the last row, e.g., row 8, are provided to the respective ADCs.

FIG. 1B is a timing diagram for a conventional pixel readout scheme of FIG. 1A. Referring to FIG. 1B, pixel signals of pixels p11 to p14 in row 1 are read out at time period t1, pixel signals of pixels p21 to p24 of in row 2 are read out at time period t2, and so forth. Each row is read out at the same time and correlated noise during the read operation appears across row, and offset and gain variation in ADCs appear in column. As described above, noise in the readout process negatively impacts the SNR in low light images and gain variation between pixels results in an image with varying intensity.

An additional concern impacting image quality is related to noise or gain error which forms a pattern in the pixel array. This is a concern because human perception of patterned noise in an image is much more sensitive than uncorrelated noise. For example, consider a case where the noise of each individual pixel output is a Gaussian distributed random variable with standard deviation x. Then define the row noise as the average output of all pixels in a row and assume it is a Gaussian distribution with standard deviation y. It has been found that humans notice the row pattern of random noise if y is more than one tenth of x. Thus, there is a need to insure that noise that is common to a row or column is much less than the individual pixel noise. If all the pixels in the row have a noise which is uncorrelated with each other, then y will be less than x by a factor of the square root of the number of pixels in the row. For a 48-megapixel image sensor with 8000 pixels in a row, then we would have y=0.011*x. Thus, for a large image sensor, uncorrelated noise will not lead to an observable row noise trend. However, since the pixels are all read out at the same time, noise in the sensor that is common to all pixels can easily form a correlated noise pattern on a row basis. Correlated noise must therefore be controlled to a level well below individual pixel noise.

Similarly, since gain variation creates a spatial noise effect in bright images, human perception is sensitive to gain variation that is correlated on a column basis. Since each ADC operates on a single column, the gain variation that is particular to the ADC forms a basic for gain variation that is correlated on a column basis. Gain variation must be well controlled to achieve favorable image quality, which is challenging with such a large number of ADC that die area allocation for high quality matching is limited and per ADC calibration is very costly and undesirable.

A major task in modern CIS design is to limit the correlated noise and gain variation to acceptable levels for high quality image performance.

BRIEF SUMMARY OF THE INVENTION

The present invention relates to an image sensor with a pixel readout reordering and a method of operating the same so as to solve the aforementioned problems. In order to relax the circuit requirement for pattern noise in a CIS array read out, embodiments of the present disclosure provide technical solutions to alter the pixel read out order and to rotate the ADC conversions between different output columns.

According to an embodiment of the invention, an image sensor includes a pixel array having a plurality of pixels arranged in rows and columns, a plurality of pixel readout lines coupled to the pixels, a multiplexing circuit coupled to the pixel readout lines and configured to selectively provide pixel signals of the pixels to a plurality of analog-to-digital converters under control of a controller. The analog-to-digital converters concurrently convert pixel signals of pixels arranged in different rows and in a same column to corresponding digital data.

In one embodiment, the multiplexing circuit includes a plurality of analog multiplexers, each of the analog multiplexers has M inputs coupled to M different pixel readout lines and an output coupled to one of the analog-to-digital converters. In one embodiment, the connection of the inputs to the output of the analog multiplexers is established by a pass transistor or a transfer gate under control of a controller.

In one embodiment, the image sensor may further include a data storage configured to store the digital data corresponding to a portion of the pixel array and a logic circuit configured to rearrange the stored digital data to a proper display order.

Embodiments of the present disclosure also provide a method of operating an image sensor. The image sensor includes a pixel array having a plurality of pixels arranged in rows and columns. The method may include coupling a plurality of pixel readout lines to respective pixels, coupling the plurality of pixel readout lines to a multiplexing circuit, coupling a plurality of analog-to-digital converters (ADCs) to the multiplexing circuit, and generating control signals, by a controller, to the multiplexing circuit to couple pixel readout signals of a first set of pixels pixels arranged in a same column to each one of the ADCs for concurrent signal conversion in a first time slot. In one embodiment, the method further includes coupling pixel readout signals of a second set of pixels arranged in the same column to each one of the ADCs for concurrent signal conversion in a second time slot different from the first time slot.

According to another embodiment of the invention, a method of operating an image sensor includes coupling a plurality of pixel readout lines to respective pixels, reading out pixel signals of pixels arranged in a same column, and providing the read-out pixel signals to a plurality of analog-to-digital converters (ADCs), and concurrently converting the read-out pixel signals to obtain digital representations of the read-out pixel signals by the ADCs.

In one embodiment, concurrently converting the pixel signals is performed in a same time interval.

In one embodiment, providing the read-out pixel signals to the plurality of analog-to-digital converters is through a multiplexing circuit. In one embodiment, the multiplexing circuit includes a plurality of electronic switches, each of the electronic switches is configured to activate and deactivate a respective electrical connection between an input and an output of the multiplexing circuit in response to a respective control signal provided by a controller.

In one embodiment, the method further includes storing the digital representations of the readout pixel signals in a data storage, and rearranging the digital representations back to a conventional display order. In one embodiment, the stored digital representations of the readout pixel signals only represent a portion of the pixel array and not the entire pixel array.

These and other benefits and advantages of the present invention will be apparent to those of ordinary skill in the art after reading the following detailed description of the embodiments that is illustrated in the attached figures.

BRIEF DESCRIPTION OF THE DRAWINGS

The embodiments of the present disclosure described herein are illustrated by way of example, and not by way of limitation. In the figures of the accompanying drawings, like reference numerals refer to similar elements.

DETAILED DESCRIPTION OF THE INVENTION

Reference throughout the present disclosure to "one embodiment" or "an embodiment" means that a particular feature, structure, architecture, or process described in connection with the embodiment is included in at least one embodiment of the present invention. Therefore, the term "in one embodiment" or "in an embodiment" in various places throughout the present disclosure are not necessarily all referring to the same embodiment. Furthermore, some particular features, structures, architecture, or process steps may be combined in one or more embodiments.

Figure 1A:
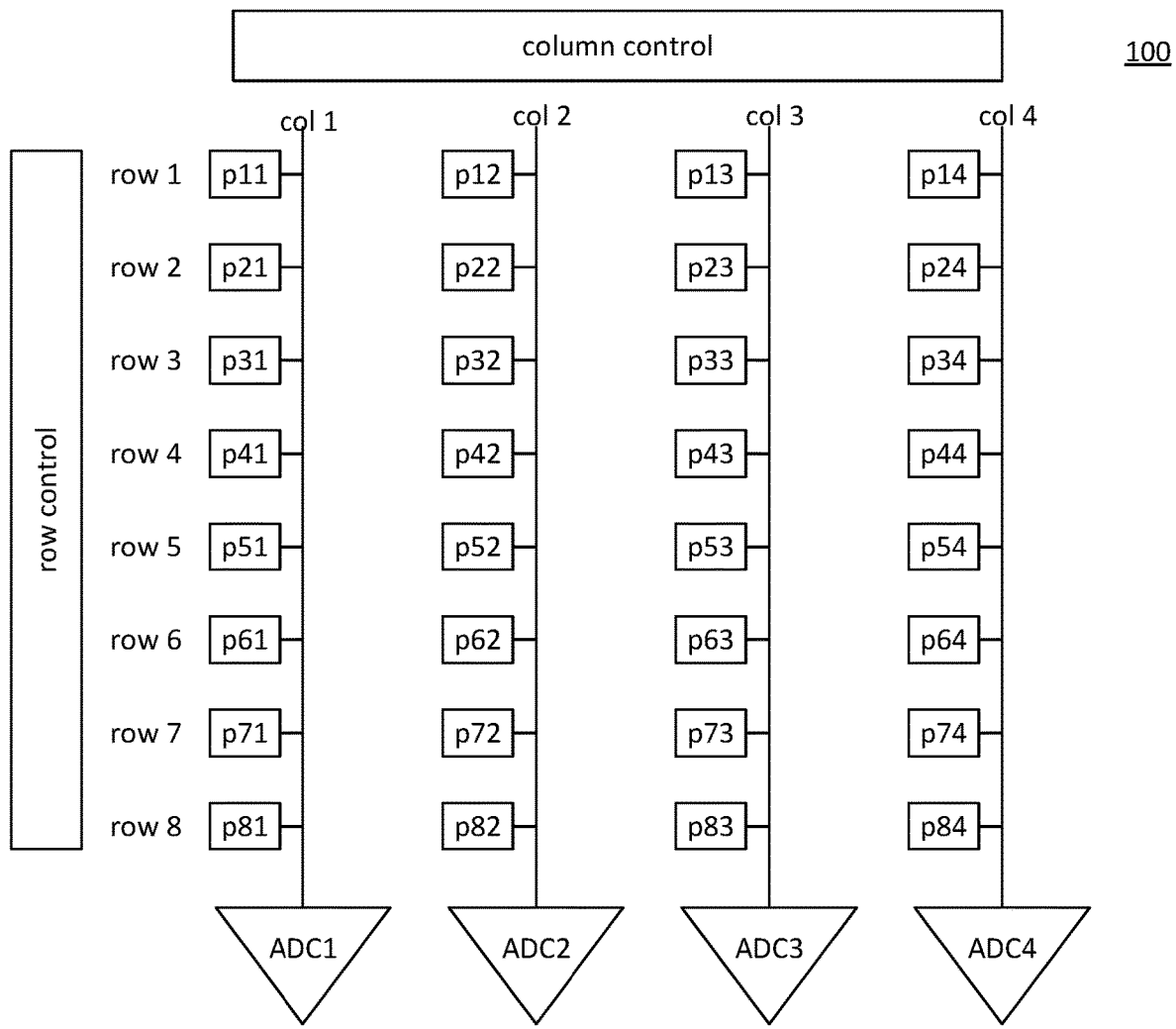
FIG. 1A is a block diagram of a conventional pixel readout scheme.
Figure 1B:
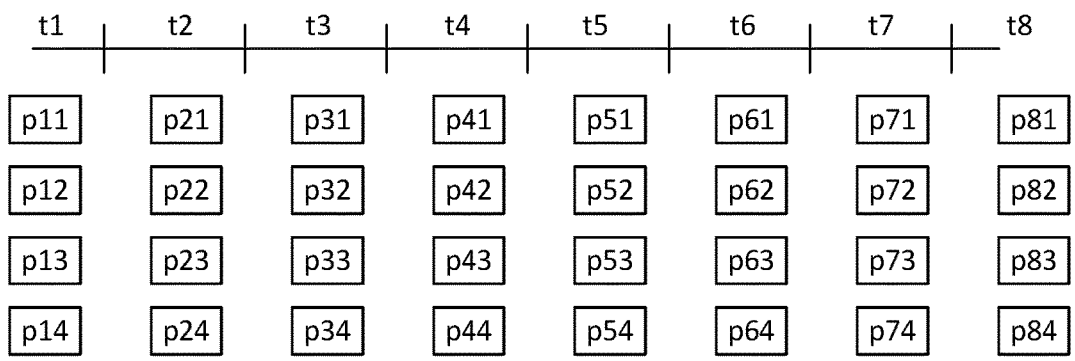
FIG. 1B is a timing diagram for a conventional pixel readout scheme of FIG. 1A.
Figure 2A:
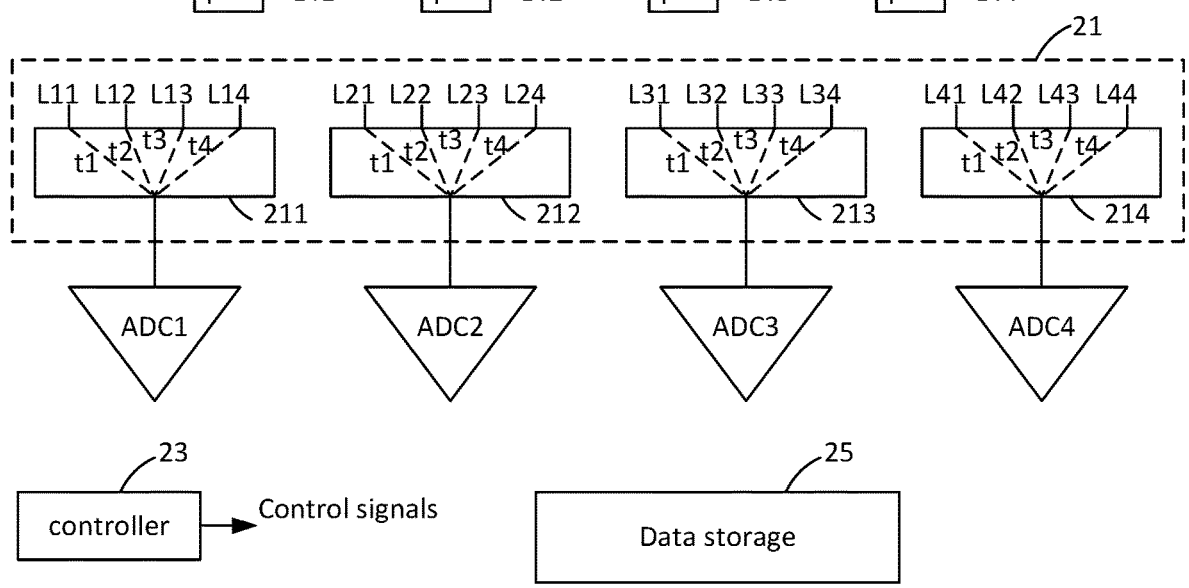
FIG. 2A is a simplified block diagram of a pixel array illustrating a readout reordering scheme according to an embodiment of the present disclosure.

FIG. 2A is a simplified block diagram of a pixel array 20 illustrating a readout reordering scheme according to an embodiment of the present disclosure. Referring to FIG. 2A, pixel array 20 includes a plurality of pixels arranged in 8 rows (row 1 to row 8) and 4 columns, i.e., each row has pixels. In contrast to a conventional readout scheme where the four pixels in a same row are read out at the same time, as shown in FIGS. 1A and 1B, pixel array 20 includes a plurality of pixel readout lines, e.g., pixel readout lines L11, L12, L13, L14, L21, L22, L23, L24, L31, L32, L33, L34, L41, L42, L43, and L44, each of the pixel readout lines is coupled to respective pixels for reading out electrical signals of the respective pixels.

Referring to FIG. 2A, the physical pixel layout of pixel array 20 is arranged from p11, p12, p13, and p14 in the first row in that order. Similarly, the physical pixel layout in the second row is arranged from p21, p22, p23, and p24, and so forth so that the physical pixel layout in the last row (row 8) has pixels p81, p82, p83, and p84 in this order. A novel concept of the present invention utilizes a readout approach that reads out pixels arranged in a same column and in multiple rows at the same time through a multiplexing circuit. The multiplexing circuit selectively provide pixel signals of pixels in the same column but different rows to a plurality of analog-to-digital converters (ADCs).

In one embodiment, the readout order is as follows: pixel signals of pixels p11, p21, p31, and p41 in the respectively rows (row 1 through row 4) of the first column col 1 are read out first, then pixels p12, p22, p32, and p42 of the second column col 2, following by pixels p13, p23, p33, and p43, thereafter, pixels of the column col 4 are read out. The readout order is indicated by the bold uppercase "P" according to some embodiments of the present disclosure. In the example embodiment, pixels p11 and p51 are coupled to a pixel readout line L11, pixels p12 and p52 are coupled to a pixel readout line L12, pixels p13 and p53 are coupled to a pixel readout line L13, pixels p14 and p54 are coupled to a pixel readout line L14, pixels p21 and p61 are coupled to a pixel readout line L21, pixels p22 and p62 are coupled to a pixel readout line L22, pixels p23 and p63 are coupled to a pixel readout line L23, pixels p24 and p64 are coupled to a pixel readout line L24, pixels p31 and p71 are coupled to a pixel readout line L31, pixels p32 and p72 are coupled to a pixel readout line L32, pixels p33 and p73 are coupled to a pixel readout line L33, pixels p34 and p74 are coupled to a pixel readout line L34, pixels p41 and p81 are coupled to a pixel readout line L41, pixels p42 and p82 are coupled to a pixel readout line L42, pixels p43 and p83 are coupled to a pixel readout line L43, and pixels p44 and p84 are coupled to a pixel readout line L44.

The pixel readout lines L11, L12, LL13, L14, L21, L22, L23, L24, L31, L32, L33, L34, L41, L42, L43, and L44 are coupled to a multiplexing circuit 21. In one embodiment, multiplexing circuit 21 includes four 4-to-1 analog multiplexer (4:1 MUX) 211 through 214, each of the 4-to-1 analog multiplexers is coupled to a respective analog-to-digital converter (ADC1 through ADC4). In one embodiment, each of the 4-to-1 analog multiplexers has four analog inputs coupled to four respective pixel readout lines and configured to receive four pixel signals and an output coupled to the ADC. In one embodiment, the connection of each input to the output of the multiplexer can be implanted using a pass transistor or a transfer gate. Pixel signals of the pixels are provided to the respective analog-to-digital converters by activating or deactivating pass transistors or transfer gates under control of a controller 23.

In the example embodiment, at time interval t1, pixel signals of pixels p11, p21, p31, and p41 are provided via the pixel readout lines L11, L21, L31, and L41 to ADC1, ADC2, ADC3, and ADC4 for signal conversion, respectively. Similarly, at time interval t2, pixel signals of pixels p12, p22, p32, and p42 are provided via the pixel readout lines L12, L22, L32, and L42 to ADC1, ADC2, ADC3, and ADC4 for signal conversion, respectively. At time interval t3, pixel signals of pixels p13, p23, p33, and p43 are provided via the pixel readout lines L13, L23, L33, and L43 to ADC1, ADC2, ADC3, and ADC4 for signal conversion, respectively. At time interval t4, pixel signals of pixels p14, p24, p34, and p44 are provided via the pixel readout lines L14, L24, L34, and L44 to ADC1, ADC2, ADC3, and ADC4 for signal conversion, respectively. At time interval t5, pixel signals of pixels p51, p61, p71, and p81 are provided via the pixel readout lines L11, L21, L31, and L41 to ADC1, ADC2, ADC3, and ADC4 for signal conversion, respectively. At time interval t6, pixel signals of pixels p52, p62, p72, and p82 are provided via the pixel readout lines L12, L22, L32, and L42 to ADC1, ADC2, ADC3, and ADC4 for signal conversion, respectively. At time interval t7, pixel signals of pixels p53, p63, p73, and p83 are provided via the pixel readout lines L13, L23, L33, and L43 to ADC1, ADC2, ADC3, and ADC4 for signal conversion, respectively. At time interval t8, pixel signals of pixels p54, p64, p74, and p84 are provided via the pixel readout lines L14, L24, L34, and L44 to ADC1, ADC2, ADC3, and ADC4 for signal conversion, respectively. ADC1 through ADC4 each convert pixel signals of the pixels into corresponding digital data. It is noted that, because of the reordering pixel readout scheme, the digital data of the pixels are stored in an order different from the display order or the physical pixel order.

Referring still to FIG. 2A, controller 23, in addition to provide control signals to turn on and turn off (activate and deactivate) the pass transistors or transfer gates, also outputs control signals to latch the converted digital data of the pixel signals to a data storage 25.

Figure 2B:
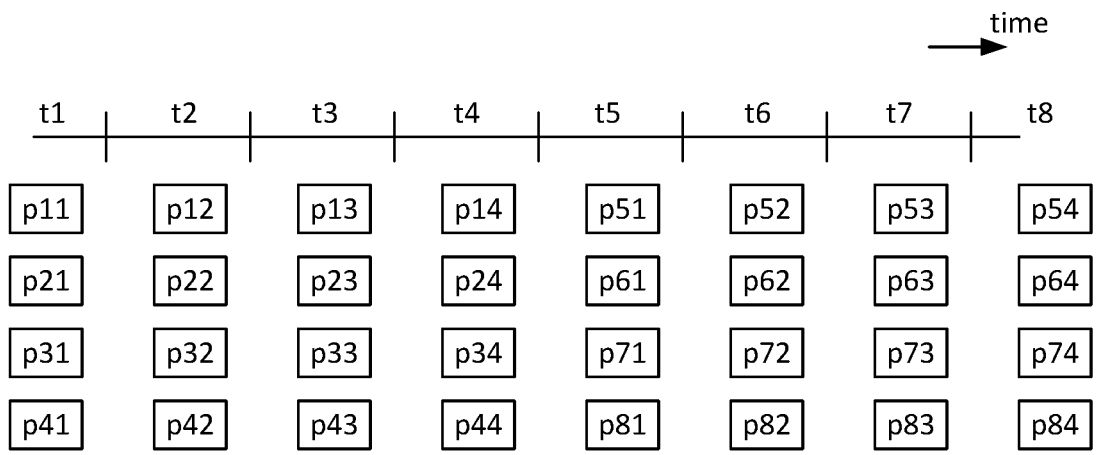
FIG. 2B is a timing diagram illustrating an operation of the example pixel reordering readout of FIG. 2A according to an embodiment of the present disclosure.

FIG. 2B is a timing a timing diagram illustrating an operation of the example pixel reordering readout of FIG. 2A according to an embodiment of the present disclosure. Referring to FIG. 2B, pixel signals of pixels p11 to p41 in respective row 1 to row 4 and column col 1 are read out at time interval t1, pixel signals of pixels p12 to p42 in respective row 1 to row 4 and column col 2 are read out at time interval t2, pixel signals of pixels p13 to p43 in respective row 1 to row 4 and column col 3 are read out at time interval t3, pixel signals of pixels p14 to p44 in respective row 1 to row 4 and column col 4 are read out at time interval t4, pixel signals of pixels p51 to p81 in respective row 5 to row 8 and column col 1 are read out at time interval t5, pixel signals of pixels p52 to p82 in respective row 5 to row 8 and column col 2 are read out at time interval t6, pixel signals of pixels p53 to p83 in respective row 5 to row 8 and column col 3 are read out at time interval t7, and pixel signals of pixels p54 to p84 in respective row 5 to row 8 and column col 4 are read out at time interval t8. Reading out from multiple rows of each column at the same time using different ADCs reduces column fixed pattern noise.

As used herein, the term "time interval" may also be referred to as "time slot," or "time period." In this embodiment, the time intervals t1 through t4 are repeated continuously after reading out pixels arranged in the four rows and four columns. In other words, the time intervals t5 through t8 correspond to the respectively t1 through t4. That is, pixel array 20 can be considered as having two identical portions, the upper portion including pixels arranged in row 1 through row 4, and the lower portion including pixels arranged in row 5 through 8.

Figure 2C:
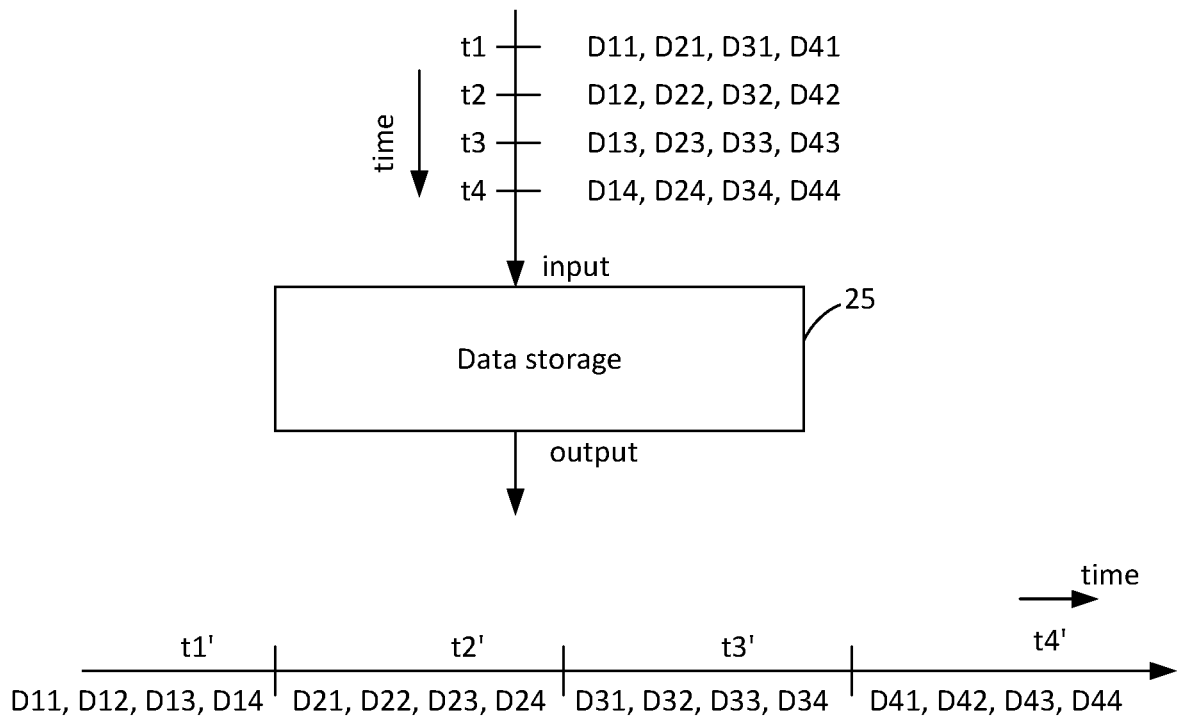
FIG. 2C is a data flow illustrating a readout operation of a data storage of FIG. 2A according to an embodiment of the present disclosure.

FIG. 2C is a data flow illustrating a readout operation of a data storage of FIG. 2A according to an embodiment of the present disclosure. Referring to FIG. 2C, digital data D11 through D41 corresponding to converted pixel signals of pixels p11 through p41 in col 1 are stored in data storage during the time interval t1, digital data D12 through D42 corresponding to pixel signals of pixels p12 through p42 in col 2 are stored in data storage 25 during the time interval t2, digital data D13 through D43 corresponding to pixel signals of pixels p13 through p43 in col 3 are stored in data storage 25 during the time interval t3, and digital data D14 through D44 corresponding to pixel signals of pixels p14 through p44 in col 4 are stored in data storage 25 during the time interval t4. It is noted that not all of the digital data of pixel array 20 need to be stored. It suffices to store only a portion of the converted digital data in the data storage. In one embodiment, controller 23 may be configured to reorder the digital data stored in the data storage into the proper display order. In one embodiment, the display order or the output order of the digital data provided by the data storage is determined based on the pixel readout reordering architecture.

In the exemplary embodiment, the digital data may be read out in an interleaving manner, e.g., in a four-address interleave configuration, i.e., D11 is readout, then D12, following by D13 and D14 in this time sequential manner. In one embodiment, the four-address interleave configuration can be implemented by a state machine to cycle the addresses of the data storage. In one embodiment, the reordering of the digital data to the proper display order may be performed by an external processor. Referring to FIG. 2C, the stored digital data D11, D12, D13, D14 are output in this time sequential order in time interval t1', D21, D22, D23, D24 in time interval T2', D31, D32, D33, D34 in time interval T3', and D41, D42, D43, D44 in time interval T4'.

Figure 3A:
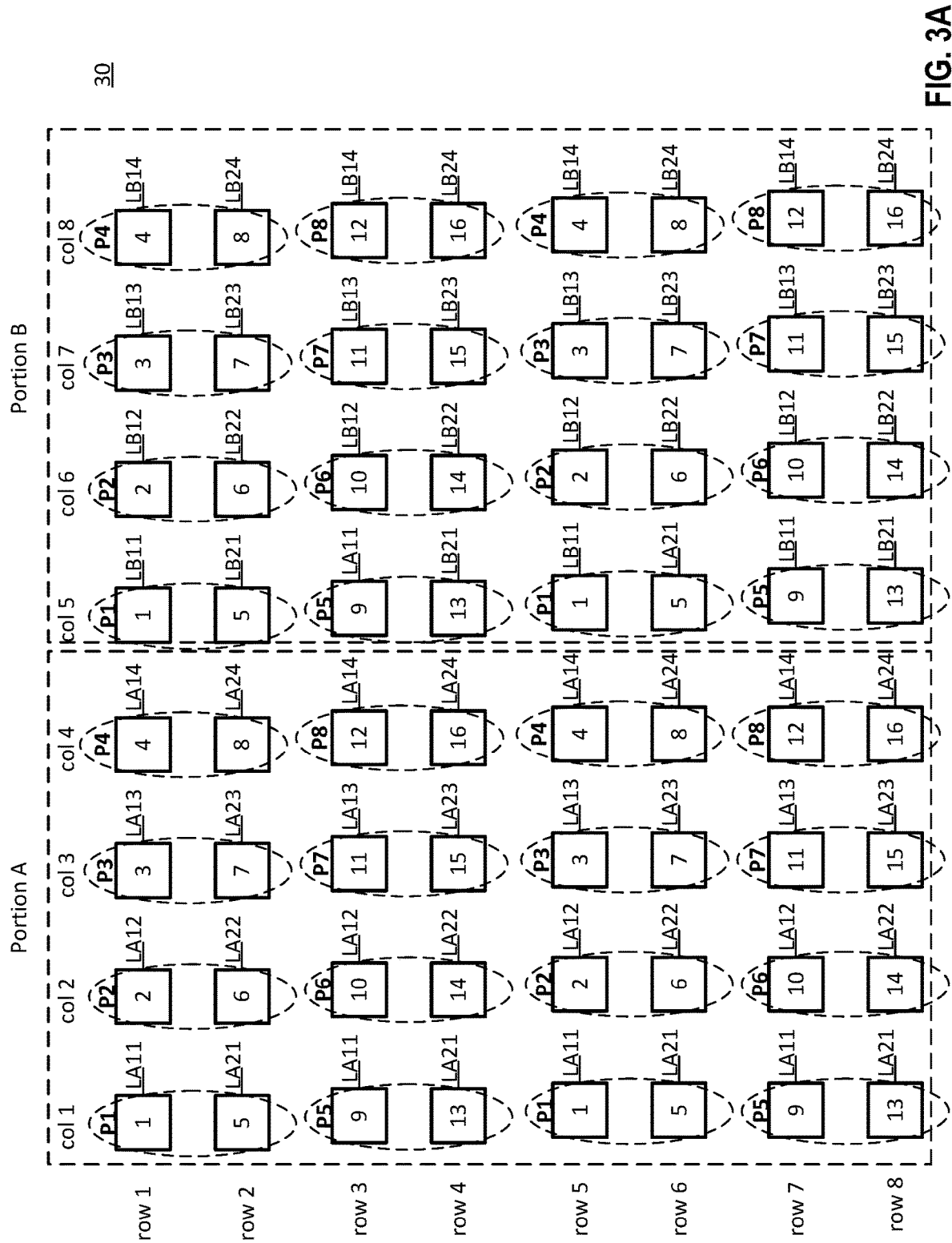
FIG. 3A and FIG. 3B are simplified block diagrams of a pixel array illustrating a general concept of pixel reordering readout according to an embodiment of the present disclosure.

FIG. 3A is a simplified block diagram of an 8×8 pixel array illustrating a general concept of pixel reordering readout architecture 30 according to an embodiment of the present disclosure. Referring to FIG. 3A, the 8×8 pixel array is split into two identical portions: portion A and portion B, each portion has the same layout structure and is controlled by same or similar control signals provided by a controller 33 (see FIG. 3B). Similarly to FIG. 2A, the bold upper case "P" denotes the readout order of the pixels in the 8×8 pixel array. In the example embodiment shown, each of the portion A and portion B includes 32 pixels. The 32 pixels in each portion A and portion B are further partitioned into two identical sub-portions. For example, portion A includes a first sub-portion including pixels arranged between row 1 through row 4 and columns col 1 through col 4, and a second sub-portion including pixels arranged between row 5 through row 8 and columns col 1 through col 4. Portion B includes a first sub-portion including pixels arranged between row 1 through row 4 and columns col 5 through col 8, and a second sub-portion including pixels arranged between row 5 through row 8 and columns col 5 through col 8. Each of the first sub-portions of portion A and portion B has the readout order of P1 (pixel pair marked with respective numbers 1 and 5), P2 (pixel pair marked with respective numbers 2 and 6), P3 (pixel pair marked with respective numbers 3 and 7), P4 (pixel pair marked with respective numbers 4 and 8), P5 (pixel pair marked with respective numbers 9 and 13), P6 (pixel pair marked with respective numbers 10 and 14), P7 (pixel pair marked with respective numbers 11 and 15), and P8 (pixel pair marked with respective numbers 12 and 16). The pixel reordering readout process P1 through P4 repeats until all pixels of the 8×8 pixel array are read out. Pixel signals of the pair of pixels 1 and 5 in each of the portion A and portion B are provided to respective pixel readout lines LA11, LA21, LB11, and LB21. Pixel signals of the pair of pixels 2 and 6 in each of the portion A and portion B are provided to respective pixel readout lines LA12, LA22, LB12, and LB22. Pixel signals of the pair of pixels 3 and 7 in each of the portion A and portion B are provided to respective pixel readout lines LA13, LA23, LB13, and LB23. Pixel signals of the pair of pixels 4 and 8 in each of the portion A and portion B are provided to respective pixel readout lines LA14, LA24, LB14, and LB24, and so forth.

Figure 3B:
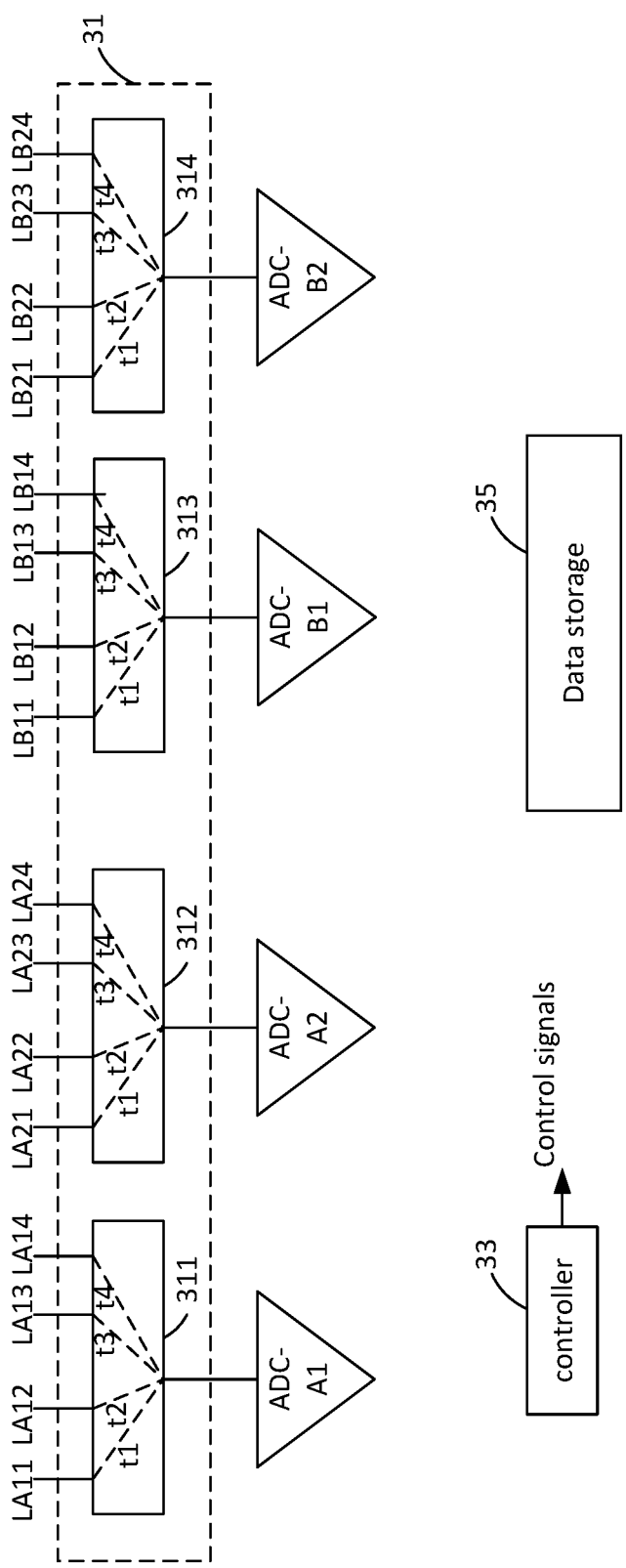

Referring to FIG. 3B, pixel reordering readout architecture 30 further includes a multiplexing circuit 31 and a plurality of analog-to-digital converters coupled to multiplexing circuit 31. In one embodiment, the plurality of analog-to-digital converters (ADCs) include four ADCs: ADC-A1, ADC-A2, ADC-B1, and ADC-B2. Multiplexing circuit 31 includes four 4-to-1 analog multiplexers 311, 312, 313, and 314. In one embodiment, the connection between any input of the analog multiplexer to its output is implemented by a pass transistor or a transfer gate (e.g., NMOS transistor). Pixel signals of the pixels at the inputs of the analog multiplexers is coupled to a respective ADC under control of controller 33, and the pixel signals are converted into corresponding digital data by the respective ADC. In one embodiment, multiplexing circuit 31 may include a plurality of electronic switches, each of the electronic switches is configured to activate and deactivate a respective electrical connection between an input and an output of multiplexing circuit 31 in response to a respective control signal provided by controller 33. In one embodiment, each of the electronic switches may be an MOS transistor, a field-effect transistor (FET) device, or the like.

Referring still to FIG. 3B, pixel reordering readout architecture 30 also includes a data storage 35 configured to store digital data provided by the ADCs. Since the pixels are not read out according to the conventional way, i.e., four pixels in each column are converted with four different ADCs, the converted digital data are not stored in the proper display order. In one embodiment, the stored digital data are reordered on the output side of the data storage to the proper display order. The reordering may be performed by control 33, using reordering logic, by an external processor (not shown) using an address interleaving scheme. It is noted that it is not necessary to store the entire pixel array. In one embodiment, only a portion of the pixel array is converted, stored in the data storage, and provided to the controller, reordering logic, or external processor for reordering back to the proper display order. The data storage may include flip-flop circuitry, latch circuit, register file, or SRAM.

Figure 3C:
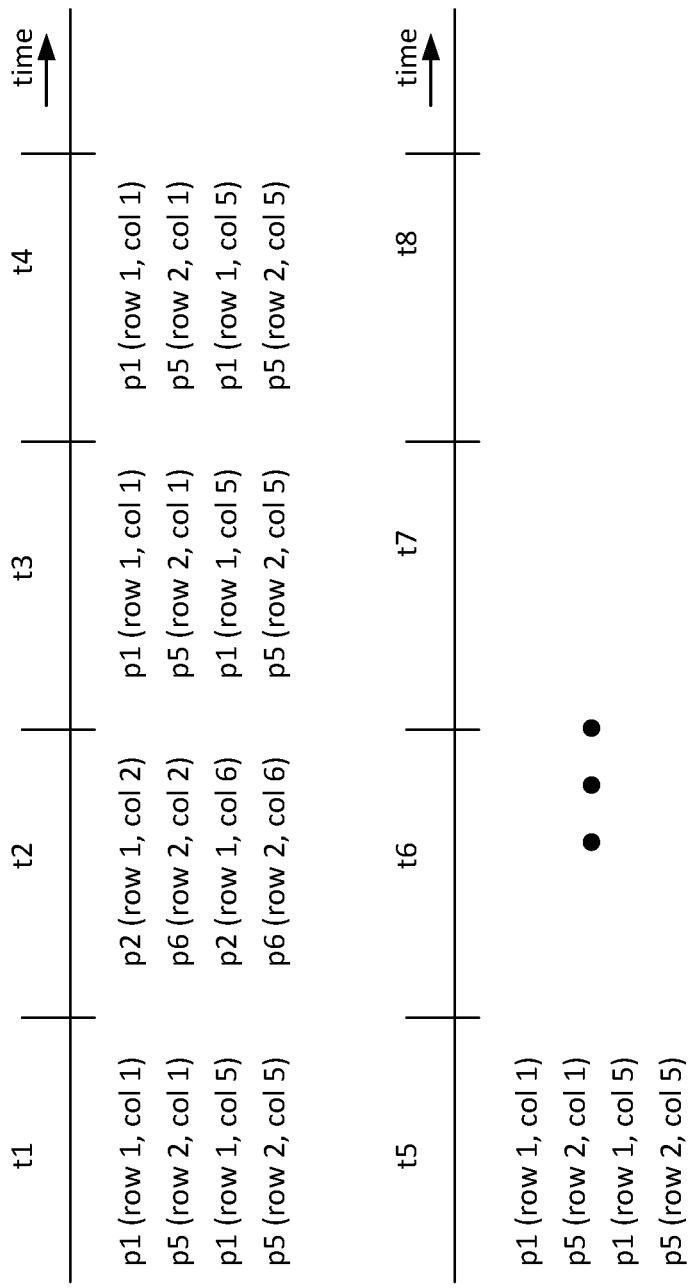
FIG. 3C is a timing diagram illustrating an operation of the example pixel reordering readout of FIGS. 3A and 3B according to an embodiment of the present disclosure.

FIG. 3C is a timing a timing diagram illustrating an operation of the example pixel reordering readout of FIG. 3A according to an embodiment of the present disclosure. Referring to FIG. 3C, pixel signals of pixel pairs (p1, p5) in respective row 1 and row 2 and columns col 1 and col 5 are read out at time interval t1, pixel signals of pixel pairs (p2, p6) in respective row 1 and row 2 and columns col 2 and col 6 are read out at time interval t2, pixel signals of pixel pairs (p3, p7) in respective row 1 and row 2 and columns col 3 and col 7 are read out at time interval t3, pixel signals of pixel pairs (p4, p8) in respective row 1 and row 2 and columns col 4 and col 8 are read out at time interval t4, pixel signals of pixel pairs (p9, p13) in respective row 3 and row 4 and columns col 1 and col 5 are read out at time interval t5, and so forth.

In order to relax the circuit requirement for pattern noise in a CIS array read out, embodiments of the present disclosure provide technical solutions to alter the pixel read out order and to rotate the ADC conversions between different output columns.

In some embodiments, a CIS includes reordering logic that alter the pixel read out order by reading from multiple pixels rows at the same time and reading out all the pixels in a single row in a larger number of sequential read out operations. By reading out pixels from multiple rows simultaneously, embodiments of the present disclosure avoid increasing the overall frame read out time or forcing faster read out operations while allowing a greater number of sequential read out operations to read out a single row. By reading out a single row in a greater number of sequential read operations, the correlated noise in a single row can be reduced. By rotating ADC conversions between different output columns as the pixel sequence readout steps move down rows in the array, this approach can insure that the average gain in a single column is determined by the averaged gain of multiple ADCs, which will typically have a lower variance than just a single ADC.

Many advantages and benefits are achieved by the embodiments of the present disclosure over conventional devices and methods. Correlated pattern noise in a CIS array pixel row is mainly driven by shared noise that create correlated noise when pixels are read out at the same time. Since normally the entire row is read out at one time, all the pixels in the row have shared noise that is highly correlated. This shared noise comes from sources such as supply, ground or reference. When pixels are read out at different times, the correlation from the shared noise source can drop almost to zero. Normally, it is not possible to read out many pixels in a row sequentially, or it is very costly to do so, because it forces the per pixel read out operation to be performed much more quickly to achieve the same overall frame rate. Embodiments of the present disclosure provide a pixel array that can read out multiple rows at the same time to remove this constraint, so that a single row with more sequential operations without impacting read out time requirement or overall frame rate can be read out.

Normally, each pixel row is read out in order because the output data format for images requires rows to be provided in sequence and the effect of rolling shutter is expected to be driven by purely sequential row reads. However, in a large CIS array (e.g., 8000 columns by 6000 rows) it is normal for several rows to be buffered in local memory for processing and before the data is exported from the die. Thus, the novel approach can read from several nearby rows with minimal impact to the storage requirements on the chip and reorder the pixels properly before they are exported from the chip.

Additionally, reading out multiple pixel rows at the same time will replace correlated noise on a purely row basis with some correlation between nearby rows. However, the visual impairment from correlated noise in a single row is much greater than from a pattern spread out over several rows and interspersed with uncorrelated data. Also algorithms which operate on image data to improve image quality or derive information from the image will tend to be less sensitive to such spread out correlated noise.

The benefit of this scheme is that it reduces the correlated noise in a pixel row without requiring better isolation in the pixel readout process from shared noise sources or reducing the noise level in these shared sources. This relaxes the area, power and complexity of circuit design in the CIS array.

Correlated pattern noise in a CIS array pixel column is mainly driven by gain variation between columns, which appears as noise between columns in stronger illumination conditions. Since a large CIS array requires so many ADCs, not very much die area can be allocated to each ADC which limits the gain matching that can be achieved. Additionally, gain calibration is difficult if it has to be performed for so many ADCs and a calibration adjustment factor has to be stored and later distributed to each ADC. If the gain variation of each ADC has a given standard deviation and an average across a certain number of ADCs is given as N, then the standard deviation of the average will be reduced by the square root of N. Thus a lower gain variation per column by rotating between multiple ADCs per column can be achieved. This results in better pattern noise performance or enables the use of ADC architectures or solutions whose intrinsic gain matching is not as favorable but have other desirable characteristics.

Embodiments of the present disclosure provide an image sensor including a pixel array having a plurality of pixels arranged in rows and columns, such as the pixel array shown in FIG. 2A or 3A. The image sensor also includes a plurality of pixel readout lines coupled to the pixels, a multiplexing circuit coupled to the pixel readout lines and configured to selectively provide pixel signals of the pixels to a plurality of analog-to-digital converters, which concurrently convert pixel signals of pixels arranged in different rows and in a same column to corresponding digital data. In one embodiment, the multiplexing circuit includes a plurality of analog multiplexers, each of the analog multiplexers has M inputs coupled to M different pixel readout lines and an output coupled to one of the analog-to-digital converters. In one embodiment, the connection of the inputs to the output of the analog multiplexers is established by a pass transistor or a transfer gate under control of a controller. The image sensor may further include a data storage configured to store the digital data corresponding to a portion of the pixel array and a logic circuit configured to rearrange the stored digital data to a proper display order.

Figure 4:
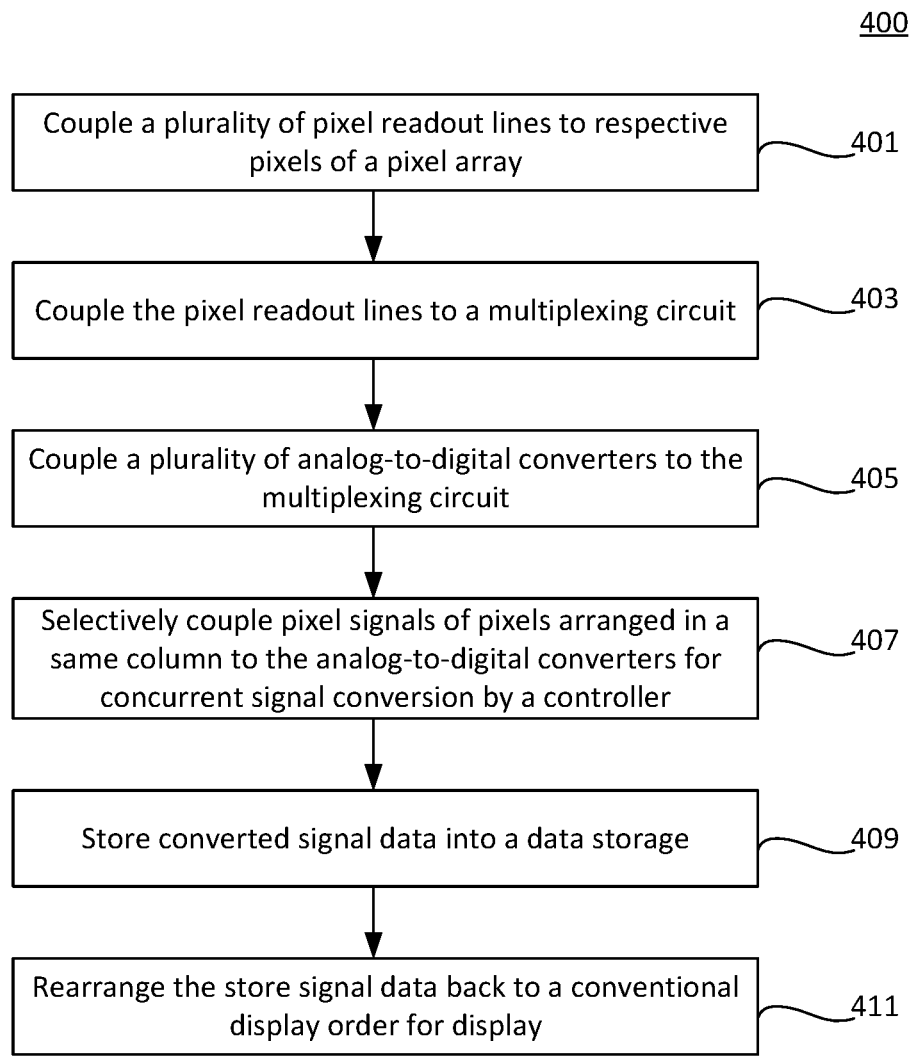
FIG. 4 is a simplified flowchart illustrating a method of operating an image sensor according to an embodiment of the present disclosure.

FIG. 4 is a simplified flowchart illustrating a method 400 of operating an image sensor according to an embodiment of the present disclosure. The image sensor includes a pixel array having a plurality of pixels arranged in rows and columns, a plurality of pixel readout lines, a multiplexing circuit, a plurality of analog-to-digital converters, and a controller. Starting at 401, the plurality of pixel readout lines are coupled to respective pixels. At 403, the pixel readout lines are coupled to the multiplexing circuit. At 405, outputs of the multiplexing circuit are coupled to the analog-to-digital converters. At 407, pixel signals of the pixels, which are arranged in a same column, are selectively provided to respective analog-to-digital converters under control of the controller for concurrent signal conversion at the same time, e.g., in a first time slot. Referring to FIGS. 2A and 2B, pixel readout signals of pixels p11 to p41, which are arranged in column col 1 are provided to each one of the ADCs (respective ADC1 to ADC4) via multiplexing circuit 21 for concurrent signal conversion in time slot t1. Pixel readout signals of pixels p51 to p81, which are arranged in column col 1 are provided to each one of the ADCs (respective ADC1 to ADC4) via multiplexing circuit 21 for concurrent signal conversion in time slot t5, which is different from time slot t1.

In one embodiment, method 400 further includes storing converted signal data in a data storage at 409, and rearranging the stored signal data to a conventional display order at 411. It is noted that only a portion of the pixel array (e.g., pixels in row 1 through row 4) and not the entire pixel array needs to converted and stored for display according to some embodiments. In one embodiment, the controller may perform the signal data rearrangement. In another embodiment, the signal data rearrangement can be performed by an external processor remote from the image sensor.

Figure 5:
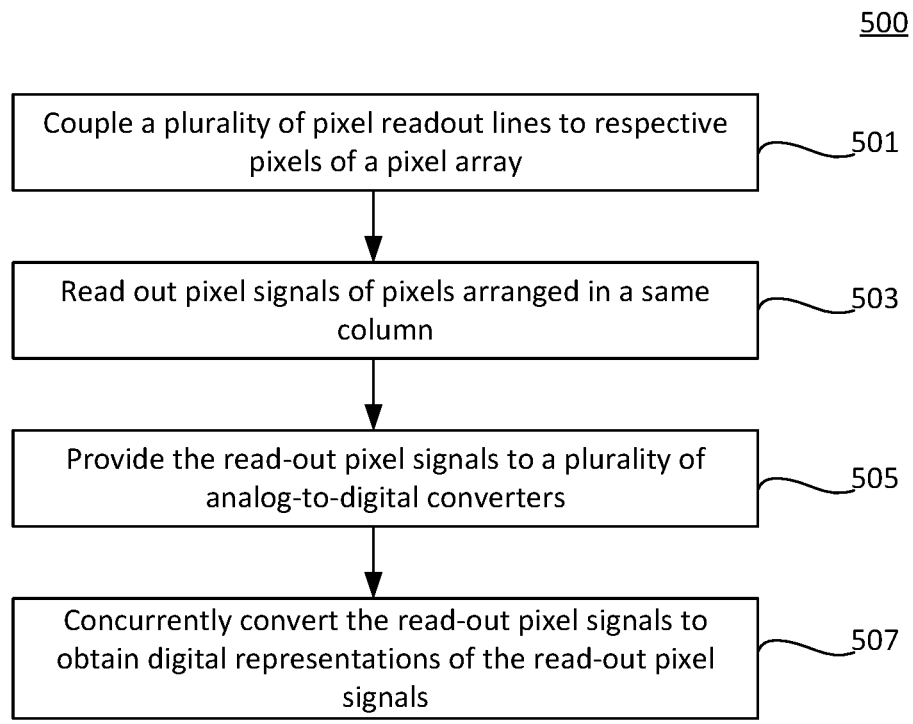
FIG. 5 is a simplified flowchart illustrating a method of operating an image sensor according to another embodiment of the present disclosure.

FIG. 5 is a simplified flowchart illustrating a method 500 of operating an image sensor according to an embodiment of the present disclosure. The image sensor includes a pixel array having a plurality of pixels arranged in rows and columns. At 501, method 500 includes providing a plurality of pixel readout lines and coupling the pixel readout lines to respective pixels. At 503, method 500 includes reading out pixel signals of pixels that are arranged in a same column. At 505, method 500 includes providing the read-out pixel signals to a plurality of analog-to-digital converters. At 507, method 500 includes concurrently converting the read-out pixel signals of pixels arranged in the same column to obtain digital representations of the read-out pixel signals. In one embodiment, providing the read-out pixel signals to the plurality of analog-to-digital converters is through a multiplexing circuit. In one embodiment, the multiplexing circuit may include a plurality of electronic switches, each of the electronic switches is configured to activate and deactivate a respective electrical connection between an input and an output of the multiplexing circuit in response to a respective control signal provided by a controller. In one embodiment, method 500 further includes storing the digital representations of the readout pixel signals in a data storage, and rearranging the digital representation to a conventional display order. In one embodiment, the digital storage only stores the data representations of a portion of pixels in the pixel array.

As will be appreciated by those skilled in the art, the innovative concepts described in the embodiments of the present disclosure can be modified over a variety of applications. Accordingly, the scope of the present disclosure should not be limited to the described embodiments discussed herein and is defined by the following claims.

What is claimed is:

1. An image sensor comprising:
  a pixel array having a plurality of pixels arranged in rows and columns;
  a plurality of pixel readout lines coupled to respective pixels;
  a multiplexing circuit coupled to the pixel readout lines;
  a plurality of analog-to-digital converters (ADCs) coupled to the multiplexing circuit; and
  a controller configured, in each of a plurality of readout time slots, to direct the multiplexing circuit form a respective plurality of readout paths for a group of pixels associated with the readout time slot, each readout path to pass a respective pixel readout signal from a respective one of the group of pixels to a respective one of the ADCs via a corresponding one of the pixel readout lines for concurrent signal conversion, the group of pixels associated with each readout time slot consisting of only a portion of the pixels from any single row of the pixel array.

2. The image sensor of claim 1, wherein the multiplexing circuit comprises a plurality of multiplexers, each multiplexer comprising M inputs coupled to M different pixel readout lines and an output coupled to one of the ADCs, M being a positive integer greater than unity, each of the M different pixel readout lines being coupled to a respective pixel arranged in a same row of the pixel array.

3. The image sensor of claim 1, further comprising:
a data storage coupled with the plurality of ADCs to store converted data of read-out pixels in each readout time slot.

4. The image sensor of claim 3, further comprising:
a logic circuit configured to rearrange the converted data back to a display order corresponding to an order of at least a portion of the pixel array.

5. The image sensor of claim 1, wherein the multiplexing circuit comprises a plurality of electronic switches, each of the electronic switches being configured to activate and deactivate a respective electrical connection between an input and an output of the multiplexing circuit in response to a respective control signal provided by the controller.

6. The image sensor of claim 1, wherein the controller provides control signals to the multiplexing circuit to connect each of the pixel readout lines to a respective ADC during a respective time slot.

7. The image sensor of claim 2, wherein, in each readout time slot, M multiplexers of the plurality of multiplexers operate concurrently to readout M pixels from M rows via M ADCs.

8. The image sensor of claim 7, wherein the M pixels read out in each readout time slot are arranged in a same column of the pixel array.

9. A method of operating an image sensor comprising a pixel array having a plurality of pixels arranged in rows and columns, the method comprising:
coupling a plurality of pixel readout lines to respective pixels;
coupling the plurality of pixel readout lines to a multiplexing circuit;
coupling a plurality of analog-to-digital converters (ADCs) to the multiplexing circuit; and
directing the multiplexing circuit, in a first readout time slot, to form a first plurality of readout paths for a first group of pixels including a first subset of one or more pixels sharing a first row of the pixel array, each of the first plurality of readout paths to pass a respective pixel readout signal from a respective one of the first group of pixels to a respective one of the ADCs via a corresponding one of the pixel readout lines.

10. The method of claim 9, further comprising:
directing the multiplexing circuit, in a second readout time slot subsequent to the first readout time slot, to form a second plurality of readout paths for a second group of pixels, the second group of pixels being distinct from the first group of pixels and including a second subset of one or more pixels sharing the first row of the pixel array, each of the second plurality of readout paths to pass a respective pixel readout signal from a respective one of the second group of pixels to a respective one of the ADCs via a corresponding one of the pixel readout lines.

11. The method of claim 9, further comprising:
storing converted data of readout pixels in a data storage; and
rearranging the stored converted data back to a conventional data order.

12. The method of claim 11, wherein the stored converted data is a portion of the pixel array.

13. The method of claim 9, wherein a number of readout time slots for reading out pixel signals of pixels arranged in the same row is greater than a number of readout time slots of a conventional pixel readout scheme.

14. The method of claim 9, wherein:
the first readout time slot is one of M readout time slots consumed for reading out all of the pixels sharing the first row of the pixel array; and
in each of the M readout time slots, M multiplexers of the multiplexing circuit operate concurrently to readout M pixels from M rows via M ADCs.

15. The method of claim 14, wherein the M pixels read out in each readout time slot are arranged in a same column of the pixel array.

16. A method of reading out a pixel array having a plurality of pixels arranged in rows and columns, the method comprising:
in each of a plurality of readout time slots associated with reading out pixels of at least a first row of a pixel array:
forming a respective plurality of readout paths for a group of pixels associated with the readout time slot, each readout path to pass a respective pixel readout signal from a respective one of the group of pixels to a respective one of a plurality of analog-to-digital converters (ADCs) via a corresponding pixel readout line coupled to the pixel, the group of pixels associated with each readout time slot including a respective subset of one or more pixels of the first row of the pixel array;
reading out the respective pixel readout signals for the group of pixels to the plurality of ADCs via the formed respective plurality of readout paths; and
concurrently converting the read-out pixel signals to obtain digital representations of the read-out pixel signals by the ADCs.

17. The method of claim 16, wherein providing the read-out pixel signals to the plurality of analog-to-digital converters is through a multiplexing circuit.

18. The method of claim 17, wherein the multiplexing circuit comprises a plurality of electronic switches, each of the electronic switches being configured to activate and deactivate a respective electrical connection between an input and an output of the multiplexing circuit in response to a respective control signal provided by a controller.

19. The method of claim 16, further comprising:
storing the digital representations of the readout pixel signals in a data storage; and
rearranging the digital representations back to a display order.

20. The method of claim 16, wherein the group of pixels associated with each of the plurality of readout time slots includes a respective subset of one or more pixels of each of a plurality of rows of the pixel array.

* * * * *